United States Patent [19]
Maurer et al.

[11] Patent Number: 5,619,562
[45] Date of Patent: Apr. 8, 1997

[54] METHOD AND SYSTEM FOR REMOTELY ACTIVATING/CHANGING SUBSCRIBER SERVICES IN A PUBLIC SWITCHED TELEPHONE NETWORK

[75] Inventors: Kevin Maurer, Old Bridge; Maria Castan, Jackson; Thomas Cousin, Haddonfield; Gilbert Spagnola, New Providence, all of N.J.; Kathleen M. Daley, Manassas, Va.; Margaret Keegan, Bowie, Md.; Thomas Smith, West Paterson, N.J.

[73] Assignee: Bell Atlantic Network Services, Inc., Arlington, Va.

[21] Appl. No.: 383,740

[22] Filed: Feb. 6, 1995

[51] Int. Cl.⁶ .................................................. H04M 3/42
[52] U.S. Cl. ............................ 379/201; 379/27; 379/207
[58] Field of Search ...................................... 379/201, 197, 379/221, 211, 67, 230, 210, 212, 243, 207, 213, 214, 244, 269, 33, 29, 1, 27; 370/62

[56] References Cited

U.S. PATENT DOCUMENTS

| | | | |
|---|---|---|---|
| 4,577,072 | 3/1986 | Lulay | 379/27 |
| 4,656,651 | 4/1987 | Evans et al. | 379/1 |
| 4,707,848 | 11/1987 | Durston et al. | 379/1 |
| 4,941,165 | 7/1990 | Rademacher et al. | 379/1 |
| 4,953,195 | 8/1990 | Ikemori | 379/33 |
| 5,001,740 | 3/1991 | Takano et al. | 379/1 |
| 5,012,511 | 4/1991 | Hanle et al. | 379/211 |
| 5,018,184 | 5/1991 | Abrams et al. | 379/29 |
| 5,073,919 | 12/1991 | Hagensick | 379/29 |
| 5,086,461 | 2/1992 | Thorn et al. | 379/230 |
| 5,222,125 | 6/1993 | Creswell et al. | 379/67 |
| 5,247,571 | 9/1993 | Kay et al. | 379/207 |
| 5,416,833 | 5/1995 | Harper et al. | 379/201 |
| 5,467,388 | 11/1995 | Redd, Jr. et al. | 379/211 |
| 5,491,742 | 2/1996 | Harper et al. | 379/201 |

*Primary Examiner*—Krista M. Zele
*Assistant Examiner*—Scott Wolinsky
*Attorney, Agent, or Firm*—Lowe, Price, LeBlanc & Becker

[57] ABSTRACT

An arrangement (apparatus and method) for remotely activating service for subscribers in a public switched telephone network. A field technician telephones a voice response unit. The field technician supplies DTMF inputs to provide a subscriber telephone number and a service to be performed. The information input to the voice response unit is supplied via a Datakit network to a change processor. The change processor is previously stored with data identifying existing office equipment and facilities for selected subscribers, and new office equipment or facilities. The change processor generates recent change signals for a central office switch corresponding to the subscribers identified by the field technician. The recent change signals are supplied via the Datakit network to a switching control center system (SCCS) host processor, which distributes the recent change signals to the appropriate central office switch, as well as any facilities or maintenance databases. The present invention is directed to cable throw, rewire, and undeveloped transfer applications, but is also suited for AIN applications including remote intelligent peripherals and subscriber self-activation using soft dial tone.

28 Claims, 6 Drawing Sheets

METHOD AND SYSTEM FOR REMOTELY ACTIVATING/CHANGING SUBSCRIBER SERVICES IN A PUBLIC SWITCHED TELEPHONE NETWORK

BACKGROUND OF THE INVENTION

1. Field of the Invention

This invention relates to public switched telephone networks (PSTNs) and more particularly relates to a method and apparatus used by field service technicians for provisioning or administering such networks, such as, for example, activating service to a customer. Prior systems required a field technician to call into a switching control center or a recent change memory administration center (RCMAC) to request that the control center personnel manually obtain the translations and generate the recent change.

2. Description of the Prior Art

Public switched telephone networks serve their customers by providing information signals from a Central Office (CO) of the telephone company to the customer premises equipment by the local loop. The local loop, also known as the subscriber loop, consists of the wires, poles, terminals, conduit, and other outside plant items that connect customer premises equipment to the central office of the local exchange carrier. Recognized as an essential part of the telephone infrastructure, the local loop still requires extensive manual labor by field technicians who install cable and perform any necessary maintenance. Billions of dollars are invested in copper wire, conduit, pole lines, buried cables, and all the other elements that comprise loop plant. The field technicians are therefore responsible for connecting the end telephone user to the central office, and includes the responsibilities of installing during construction telephone lines, typically for up to 1,000 subscribers, routing the wire to the central office switch, and activating the circuit path to obtain a dial tone. In addition, enhanced services may need to be installed, depending on the requirements of the user, for example, call waiting, three-way calling, call forwarding, etc.

The field technicians are also responsible for the maintenance and upgrades of a local loop equipment. Such maintenance includes rerouting telephone lines after weather hazards, or upgrading existing wire, for example from copper to optical fiber.

Once the telephone lines have been installed at a subscriber's address, activation of the service must be performed in order to provide telephone service to the subscriber.

Figure 1:
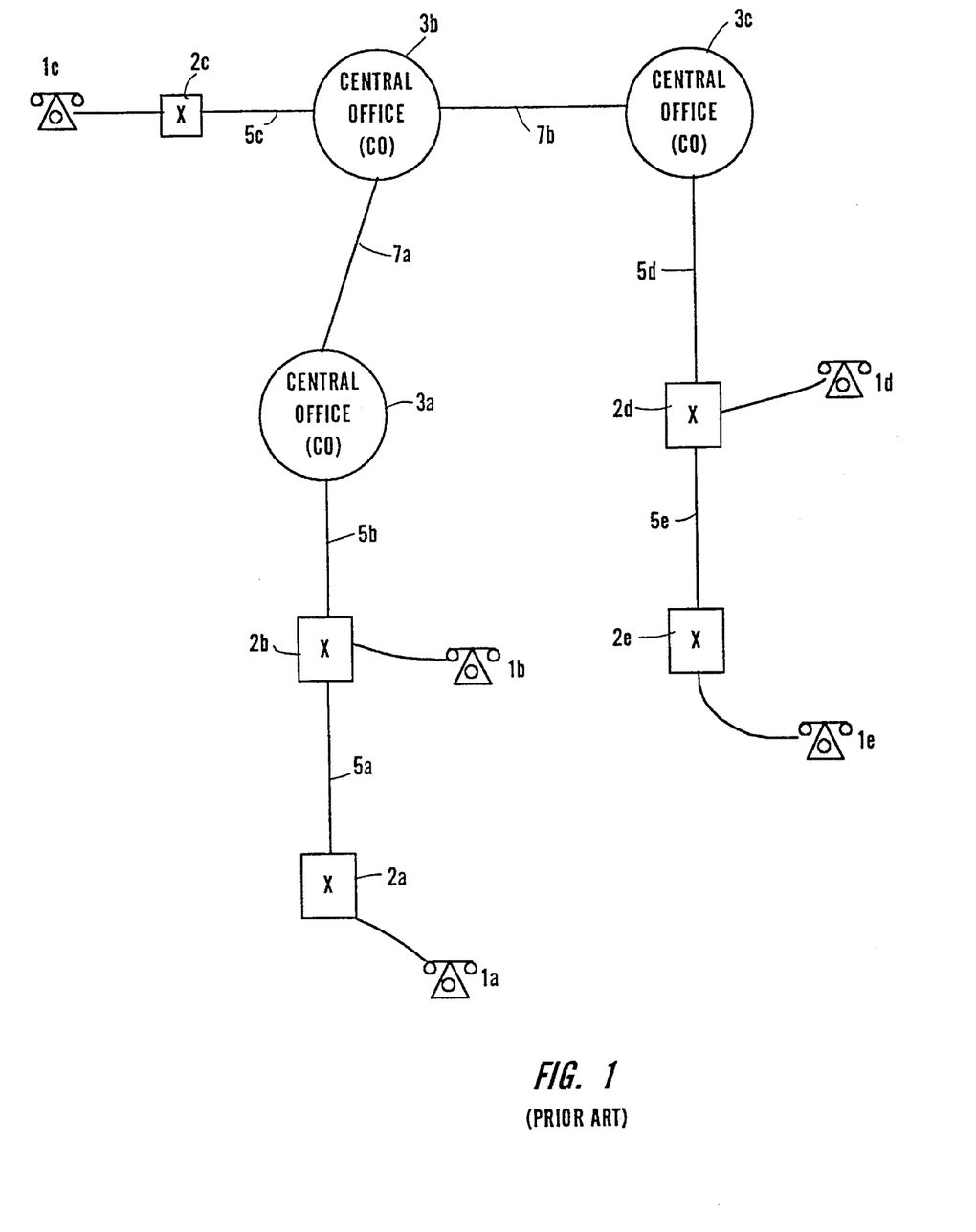
FIG. 1 is a diagram illustrating telephone company facilities for providing telephone service to a plurality of subscribers.

FIG. 1 is a diagram illustrating the basic structure or arrangement of the customer and telephone company facilities for providing telephone service or connection between a telephone caller and a telephone receiver destination. As illustrated in FIG. 1, telephone sets 1a, 1b, 1c, 1d, 1e represent different addresses or customer locations which receive and initiate telephone calls. In order for a customer location or address to establish or receive telephone service, each location or address must be physically connected to a central switching office or central office (CO) 3a, 3b, 3c via a physical copper cable pair or fiber optic cable. The cable pair which connects customer locations 1a, 1b, 1c, 1d, 1e often require intermediary connections via cross connect devices 2a, 2b, 2c, 2d and 2e. In this situation, there may be several legs of cable pairs 5a, 5b, 5c, 5d, 5e between cross connect devices 2a, 2b, 2c, 2d, 2e. The combinations of cable pairs which connect the customer location to the serving CO is commonly referred to as "outside plant". Central offices 3a, 3b, 3c are connected together via trunk lines 7a, 7b.

Once the customer location is connected to the CO via an in-coming frame at the CO 3a, 3b, 3c, the customer location must also be allocated office equipment (OE) which provide the specific calling features requested by the customer location. For example, the customer may request such features as call waiting or call forwarding which require different OE or different configurations of OE in CO 3a, 3b, 3c. Once the customer location is able to access the CO, the customer location may be connected via a CO to another customer location serviced by the same CO, such as customer location 1a calling customer location 1b which is connected or switched by CO 3a. Alternatively, the customer location may be connected to another customer location which is serviced by a different CO. For example, customer location 1c will be connected to customer location 1e via COs 3b and 3c, and cable trunk 7b.

The combination of outside plant and OE which is allocated or "provisioned" for a customer location is typically referred to as customer facilities which are always associated with the customer location until the customer location decides to disconnect service, e.g., the customer location moves from one calling area to another calling area. As illustrated in FIG. 1, the arrangement of the outside plant and OE can become extremely complicated, particularly in view of the quantity of customer facilities which must be provisioned for each customer location.

The current state of the art of provisioning of residential services to customers of PSTNs, i.e., customer facilities, follows a series of steps not conceptually different from the steps that were followed in a manual provisioning environment some thirty years ago. The individual work steps have since been mechanized, and the mechanized steps have been connected with interfaces.

Figure 2:
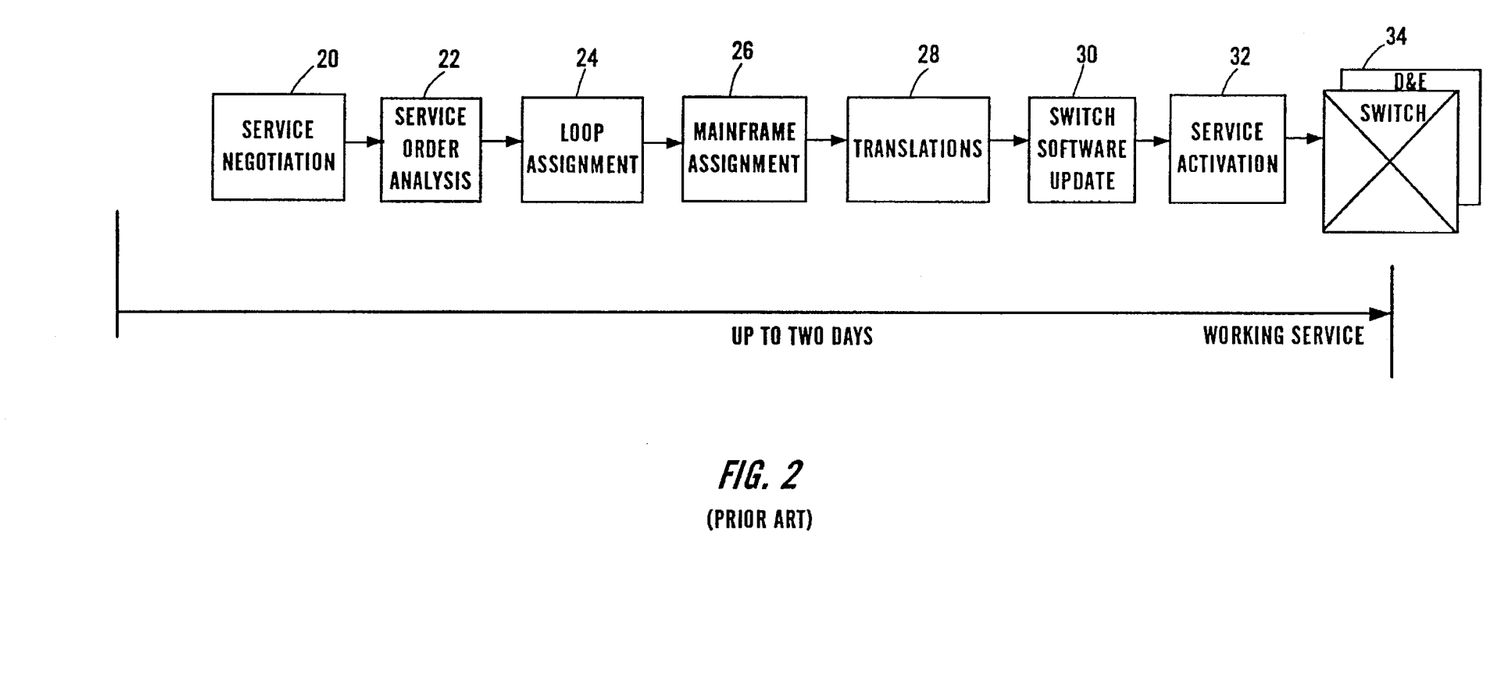
FIG. 2 is a flowchart illustrating a procedure by which service ordered by a customer is implemented in the public switched telephone network.

The steps necessary for conventional service provisioning are illustrated in FIG. 2. Service is negotiated with the customer at step 20, matching the customer needs with the available products and services. The first service that is negotiated is basic service which will determine the calling plan for the customer. This is followed by the negotiation of toll services and other optional services such as touch tone, custom calling services and maintenance plans.

The due date for installation is negotiated and scheduled, and a Telephone Number is selected from the PREMIS or Service Order Processor (SOP) systems. PREMIS is an on-line address-based system used by service representatives for service order negotiation. It provides street address, Living Unit (LU), previous credit status, equal access carrier data, facility availability, and Telephone Number (TN) selection capabilities. The service representative uses PREMIS to verify the address, determine the working status of the address, and determine the serving wire center and other common address information, such as community and tax codes. Based on the wire center serving the customer, the service representative is able to determine what services are available to the customer. Selection of the Telephone Number will be based on the wire center serving the area and the availability of the telephone number.

The service representative reviews the service request and prepares a service order that reflects the customer's requirements. The service order is then issued or released to the service order processor (SOP). The SOP checks the order in step 22 for format accuracy and determines what centers or systems should receive the service order. The service order is then distributed to the systems and centers.

The service order is next received by the Service Order Analysis and Control System (SOAC). The order is validated and checked for format accuracy. An initial determination is made for orders that might require manual work or testing. If the order might require work or testing, a planning message is sent to a Work and Force Administration/Dispatch Out (WFA/DO) system. WFA/DO system makes the final determination as to whether a dispatch or testing is required.

The Service Order Control system determines in step 24 if loop facilities are required for the order. This is based on Universal Service Order Codes (USOC) and Field Identifiers (FID) on the order. If a loop facility is required, an assignment request (AR) is prepared and sent to the Loop Facility Assignment and Control System (LFACS). The assignment request contains the address, order number, telephone number, and date due. An outside plant equivalency code (OEC) that has been determined based on the type of service is included in the request. The OEC designates the type of facility required for the request.

The service address is first matched with addresses in the Loop Facility inventory system. If there is an address match, the status of the living unit is checked to insure that there is not already working service at the living unit address. The terminal address is then determined. Once the service address and terminal address have been verified, a network facility matching the request is selected. After the facility is selected the information in the form of an assignment request response (ARR) is sent back to the Service Order Control system.

The Service Order Control system determines switch equipment requirements, prepares the request and sends an assignment request to the Switch Inventory system in step 26. The assignment request is received by the Switch Inventory system from the Service Order Control system. This request will contain information as to the type of switch facilities required, the loop facility that must be connected, the telephone number, the service order number, and the date due.

The loop facility and telephone number received in the assignment request are verified with the Switch Inventory system data. The status of each is checked to insure that the request can be completed as requested. The switch equipment is selected based on the requested switch facility, the loading of the switch and the jumper length to be connected. The selection also will determine if an existing jumper has been left in place. Based on these criteria, switch equipment is selected. The switching equipment which is typically used involves a stored program control switch (SPC) such as a 1ESS or 1AESS switch.

After the selection of switch equipment, the information is sent to the Service Order Control system. The Service Order Control system assembles the information received from the Loop Facility Inventory System and the Switch Inventory system. This information is formatted as an assignment section and placed on the service order. The assigned Service Order (SO) is then sent to the SOP. The SOP determines where the service order should be sent and distributes the service order.

The Service Order Control system also sends the assigned service order to the Work and Force system, whereby work is performed as required. If other work in the field or in the central office is required, this work is completed and reported back to the appropriate center or system. Work may include placing jumpers in the central office or in the loop facilities, connecting the customer to the network and placing inside wiring and jacks at the customer premise.

After completion of the service request the completion information is sent to the SOP. This information may include the completion time and date, any changes to the service order and any billing information that needs to be added for time and material charges.

The Service Order Control system determines in step 28 if memory administration is involved in the request and if so determines if it has the required information to prepare a translation packet to send to the Memory Administration System (MAS). The translation packet is then created. If a translation packet cannot be prepared, an image of the service order is prepared. The translation packet or the service order image is then sent to the Memory Administration System.

The translation packet or service order image (TP/SOI) is received and validated in the Memory Administration System which then determines what needs to be done to complete the request.

The Memory Administration System (MAS) creates a machine readable Recent Change (RC) message in step 30 to match the vendor specific switch type and generic. The RC message is then sent to the switch at a designated time and the switch is updated.

The SOP receives the completion information at 32 and prepares the completed service order for distribution. The SOP determines the distribution of the service order and the completed service order is distributed to all systems requiring the information. Thus, the service order is sent to a number of systems including Loop Maintenance, Billing, Directory, and E-911. The service order is also sent back to the Service Order Control system in step 32 to update the status of the facilities from Pending Connect or Disconnect to Working or some idle status. The Service Order Control system receives the completed service order and validates the format of the information, and determines the network requirements. In this case, since the order is completed, the requirement is to change the status of the facilities from Pending Connect to Working. If the request was for a disconnect this would change from Pending Disconnect to Disconnected.

The Assignment Request is sent to the Loop Facility system, which matches information received in Assignment Request with existing facility data and updates the status of the facility from Pending Connect to Working or from Pending Disconnect to Disconnected. An Assignment Request Response is sent to the Service Order Control system and switch facility requirements are determined. In this case, the requirement is to change the status of the facility from Pending Connect to Working or from Pending Disconnect to Disconnect.

At 34 an Assignment Request to the Switch Inventory system is sent to update the status of the facility and the Telephone Number. The Assignment Request is received from the Service Order Control system and the appropriate status changes are made. The status of the facility and the Telephone Number are changed. The Status Inventory system inventories and administers the use in aging of telephone numbers. When a telephone number is disconnected, it will be aged for a specified period of time before being reused. After the status of the switch facility and telephone number have been completed, a confirmation is sent to the Service Order Control system.

Figure 3:
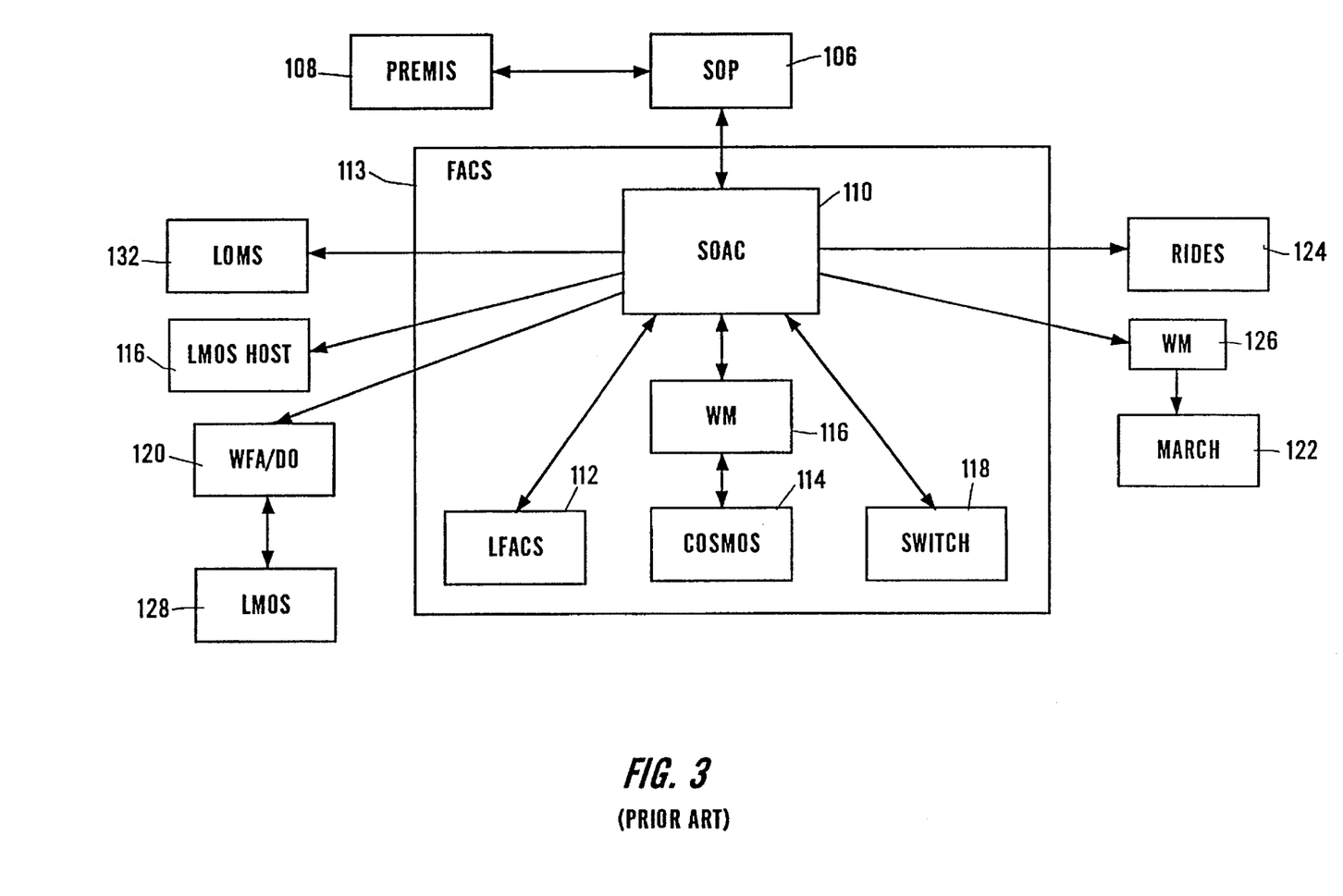
FIG. 3 is a diagram disclosing a conventional (prior art) architecture for carrying out the process of FIG. 2.

Referring to FIG. 3 there is shown a typical architecture for carrying out the above described methodology. The Service Order Processor (SOP) is shown at 106. The SOP 106 obtains the information from the customer calling for service and puts that information on the service order which is sent by the SOP 106 to a Facility Assignment Control System (FACS) 113. The FACS 113 is an automated facility assignment system that assigns loop facilities and office equipment to a subscriber address in response to the provisioning request or service order in order to provide telephone service.

FACS is an automated facilities assignment system which attempts to optimize the use of loop facilities and office equipment including jumper cables to minimize the amount of unused inventory and cost to the telephone service provisioning company. FACS, an on-line computer system, administers, inventories, and assigns the complete circuit from the customer's premises to the local serving office. FACS is the primary automated support for the provisioning work group since it keeps track of all interconnections and segments (working and available). FACS maintains inventories of outside plant (OSP) and central office (CO) facilities and uses the data to make assignments.

The service order is received from SOP 106 by the Service Order Analysis and Control system (SOAC) 110. SOAC is the controller of service order flow within the FACS 113 and handles most of the interfaces between FACS 113 and other systems, such as the Service Order Processor (SOP) 106. SOAC 110 reads the service order line by line and determines if FACS 113 can process the order. If the assignment requirements can be determined and met in an automated fashion, FACS 113 automatically assigns the service order. If SOAC 110 reads a Field Identifier (FID) or Universal Service Order Code (USOC) that is beyond the FACS' capability, the service order is sent to the service provisioning work center for manual intervention using perhaps LOMS 132. SOAC 110 also detects errors that are routed back to the originator for correction.

If SOAC 110 can completely interpret the service order, it builds Assignment Requests (ARs) which are sent to LFACS 112 and COSMOS 114 or SWITCH 118 to request outside plant facilities and central office facility assignments, respectively. After assignments are made, SOAC 110 receives Assignment Request Responses (ARRs) from LFACS 112 and COSMOS 114, merges and formats this data into a service order assignment section and automatically returns it to the Service Order Processor (SOP) 106.

SOAC 110 tracks all service orders and Line and Station Transfers (LSTs) through completion or cancellation. Status information is maintained on all service requests as well as the service order image and relevant data that results from processing.

SOAC 110 also includes the capability of supporting multiple SOACs residing on one or more machines. This capability is called SOAC Tandem. For orders that contain wire centers supported by more than one SOAC, SOAC Tandem provides tracking of all involved SOACs and the linking of assignment data generated by all involved SOACs. Hence, the SOP 106 only needs to communicate with one SOAC for any multi-SOAC order.

Depending upon the specific services requested, a Trunk Facility System (TFS), such as TIRKS, may be involved. A service order is sent to the appropriate SOAC 110 by the SOP based on the header wire centers for non-TFS involved orders or the Circuit Administrative Area for TFS involved orders. The particular SOAC 110 that receives the service order determines whether other SOACS potentially may be involved, based on the wire centers and/or NPA-NNXs appearing on the order. If there is more than one potentially involved SOAC, the SOAC 110 that receives the order is the controlling SOAC for the order and the other potentially involved SOACs are called the subordinate SOACs.

Conventionally, SOAC processing takes place in each involved SOAC to generate the necessary assignments for the wire centers involved in the SOAC. Each involved SOAC sends its SOP status and assignment data to the controlling SOAC. The controlling SOAC tracks and sequences all responses sent back by all involved SOACs. When all solicited responses and any subsequent unsolicited responses have been received by the controlling SOAC, the controlling SOAC analyzes the provisioning status and determines the appropriate response (if any) to return to the SOP. Assignment data returned by involved SOACs is linked by the controlling SOAC before it is sent to the SOP. Besides communicating with the SOP, the controlling SOAC is also responsible for communicating with all other order level SOAC interfaces, such as TFS.

SOAC also records the pass of a service order. The pass identifies the current phase of the order as determined by the service order issuance group. There are five pass types as described below:

1. Pre-completion (PRE)—The initial issuance of a service order.

2. Correction (COR)—A change to the initial service order prior to completion in the SOP.

3. Post Completion (PCN)—Notification that the service order has been completed without corrections in the SOP.

4. Completion with Correction (CPC)—A completion notice that identifies changes made to the service order at the time it was worked. This pass also completes the service order in the SOP. If a CPC pass is sent and SOAC detects that the changes may affect assignment, SOAC sends a notice to the service provisioning work center. IF necessary, the user updates the LFACS and/or COSMOS databases.

5. Cancellation (CAN) notification that the service order has been cancelled.

SOAC reads the changes on each new pass of a service order. If a COR pass is sent and changes are needed on the assignment, FACS attempts to automatically reassign the service with the necessary changes.

The service order is parsed out by SOAC and a determination is made as to whether there is a loop facility required for the order. An Assignment Request (AR) is made to the Loop Facility Assignment and Control System (LFACS) 112 where a loop facility is requested for the specified address. LFACS maintains a mechanized inventory of outside plant facilities, (e.g., facility addresses, cables, cable pairs, serving terminals, cross connection devices, loops, etc.) and assigns the outside plant facilities to ARs (Assignment Requests) received from SOAC as a result of customer service order activity. LFACS sends this assignment back to SOAC via ARRs. LFACS also generates work sheets for cable transfers and These activities are updated reconcentrations. mechanically upon notification of completion.

In addition, LFACS changes existing loop inventory with maintenance change activity and facility modifications via transactions input into the system by the user. Information once contained in Dedicated Plant Assignment Cards (DPAC) and Exchange Customer Cables Records (ECCR) for use in the manual assignment process is now maintained in an automated database. As a consequence of assignment requests from the Service Order Analysis and Control (SOAC) system or inquiries from Loop Assignment Center (LAC) personnel, LFACS applies appropriate algorithms to information contained in the database in order to provide appropriate responses.

The LFACS assignment process consists of two parts: the blocking function and the assignment function. The blocking function identifies the serving terminal. The automatic assignment function uses information provided by the blocking function in conjunction with an assignment algorithm appropriate for the type of service requested. The automatic assignment function can select reserved, connect-through, committed and spare pairs. If an assignment cannot be made in one of the above ways, a pair can be selected alternatively by breaking a connect-through which has remained idle for longer than a specified time period (overaged), by performing a line and station transfer, or by breaking an underaged connect-through. The order of the selection of pairs is controlled by parameters specified at the terminal or wire center level. In addition to automatic processing, LFACS supports a capability which allows a user to manually select and assign any OSP facilities.

The LFACS administration of circuit terminations and facilities allows for single-loop single-line circuit terminations, multi-loop single-line circuit terminations, and multi-party circuit terminations with the use of appropriate bridging rules. Two or more circuit terminations may share a common facility, e.g., cross-box or field bridging.

LFACS supports the assignment and administration of multiple outside plant, dedicated outside plant, and serving area concept. This includes the specific types of hardware associated with each type of administration. The LFACS assignment function processes customer initiated inward, outward and change activity for circuit terminations.

SOAC matches the address from PREMIS to a possible address in LFACS. If a match is found it proceeds with processing by matching that to a terminal serving the address. It then begins to select a pair back to the central office. Once this is completed, the Assignment Request Response (ARR) is sent back to SOAC and the loop part of the connection is fixed.

SOAC makes an assignment request to the Computer System for Mainframe Operations (COSMOS) 114 via Work Manager (WM) 116 or SWITCH 118. The WM links COSMOS to the other FACS components. Inquiries and transactions to COSMOS are sent through the WM which controls the load level of the message delivered to COSMOS. If COSMOS fails, the WM stores the ARs (Assignment Requests) generated by SOAC during the down time and distributes them to COSMOS when it is restored.

COSMOS maintains an inventory of central office facilities (e.g., office equipment (OE), tie pairs (TP), bridge lifters (BL), telephone numbers (TN). COSMOS assists the Network Administration (NAC) and Frame Control Centers (FCC) in managing, controlling, and utilizing main distributing frame and central office equipment, facilities, and circuits. The system performs preferential assignment of line equipment, frame jumper reuse, tie pair management for Plain Old Telephone Service (POTS), frame work management and includes extensive reporting capabilities.

COSMOS receives ARs from SOAC after a successful LFACS assignment and automatically assigns line equipment and certain miscellaneous central office equipment. COSMOS responds back to SOAC with ARRs. Cable transfers and reconcentrations generated by LFACS are automatically established in COSMOS. These transactions can be manually input into COSMOS if necessary.

The SWITCH system 118 is an operations system to inventory and assign central office switching equipment and related facilities. It allows companies to provision, efficiently and economically, a network that is comprised of both digital and analog technologies. The SWITCH system provides improved computing methodology and a new database structure to support quick incorporation of new technological developments and to accommodate differences in technology between vendors. The SWITCH system will support digital and other new technologies/services in a single, integrated, flow-through provisioning system. In particular, the SWITCH system is designed to handle ISDN inventory and assignment requirements, and to facilitate ISDN flow-through provisioning. The SWITCH system is also designed to support inventory and flow-through assignment capabilities as appropriate for digital overlay networks and integrated digital facilities.

The SWITCH system will provide integrated inventory and flow-through assignment control for circuit switches, packet switches, ISDN switches, derived channel technologies, and for any associated transmission equipment and intra-office facilities (e.g., tie pairs) required to support the provisioning of these switches and technologies. SWITCH is designed to support integrated line and trunk side provisioning requirements and will ultimately replace and expand both COSMOS and TAS functionality.

COSMOS or SWITCH attempts to match the facility obtained from LFACS with the F1 facility, and the Telephone Number selected by PREMIS. If a match is secured office equipment is assigned.

SOAC then sends the assignment request to LFACS, sends a planning message to the Work and Force Administration/Dispatch Out (WFA/DO) 120 and provides notification that there is a need to make a determination if there is any outside work to be done. After the assignment request response has been received from COSMOS, information is sent to Memory Administration Check System (MARCH) 122 for memory administration work and to the Remote Intelligent Distribution Element Support System (RIDES) 124, which handles the fiber electronics, if required. A Work Manager (WM) 126 is disposed between SOAC and MARCH. After the assigned service order is received at WFA/DO a mechanized loop test is initiated by the Loop Maintenance Operation System (LMOS) 128. After the service is completed, the LMOS host 130 will receive a completed service order for record maintenance.

Service orders that do not automatically flow through the provisioning process fall out of automatic processing and are managed by the LAC Operations Management System (LOMS) 132. LOMS assists the Mechanized LAC Assignment Center (MLAC) in management of Requests for Manual Assistance (RMAs). The primary function of LOMS includes the creation of work packages for assignment personnel and monitoring the flow of orders through FACS and the service provisioning work group. The entire conventional provisioning process may require up to two days to complete.

Two important work centers interface with FACS. These work groups are the Frame Control Center (FCC), and the Installation Control Center (ICC).

The FCC is responsible for the administrative, force control, work control, and analysis functions associated with the installation and maintenance of cross-connects of loop, special service, carrier, and message trunk circuits and their associated activities in central offices. The center is responsible for providing related order status and work completion information to the support systems, COSMOS and the TIRKS system, or to Order or Circuit Control Centers. The centers will also be responsible for the support of facility maintenance, sectionalization and/or substitution of facilities in connection with failures detected by routing testing or customer complaints.

The ICC has responsibility for and performs the administrative functions associated with work activities including:

Installation Force Management,

Order tracking,

Work assignment and dispatch,

Field-force coordination and progress tracking,

Force planning,

Prepost completion dispatch testing, and

Completion notification to the service order centers and to the customer when required.

The ICC performs these functions for installation work groups, which are the field forces responsible for installation of the service drop, protector, network channel terminating equipment, network terminating work, and network interface. The ICC interfaces with FACS through WFA/DO the Work and Force Administration/Dispatch-out system. This interface is optional and is not installed in all companies. Where WFA/DO and its interface to FACS do not exist, the ICC gets its information from FACS as a function of the normal service order flow. The WFA/DO interface speeds the process and provides additional automation to assist the work in the ICC.

As discussed above, a substantial amount of coordination is required between field service personnel and central office personnel in activating service, or in performing a cable throw or rewire. In a cable throw operation, existing cables are exchanged or rerouted by the field technician for new cables in the vault. The placement of the new cable requires a change of downtime for each line attributable to the cable. The cable throw may be either a cable to fiber conversion, or copper fiber cable to another copper fiber cable. A rewire refers to a procedure whereby a drop wire to a subscriber's living unit is disconnected from one feed terminal and rewired to another feed terminal. In either instance, the labor intensive practice involves close coordination between the outside plant technician, the construction maintenance center (CMC), the switching control center (SCC), and the recent change memory administration center (RCMAC). These systems require a field technician to call into a switching control center or on RCMAC to request that the control center personnel manually obtain the translations and generate the recent change. Thus, if field technicians or splicers are unable to coordinate changes with the central office, improperly assigned cable paths may result.

In addition, the hardware operation by the field technicians are completely dependent upon the specific hardware purchased by the telephone company. As switching technology becomes more advanced, efforts at performing cable transfer become more complex.

Figure 4:
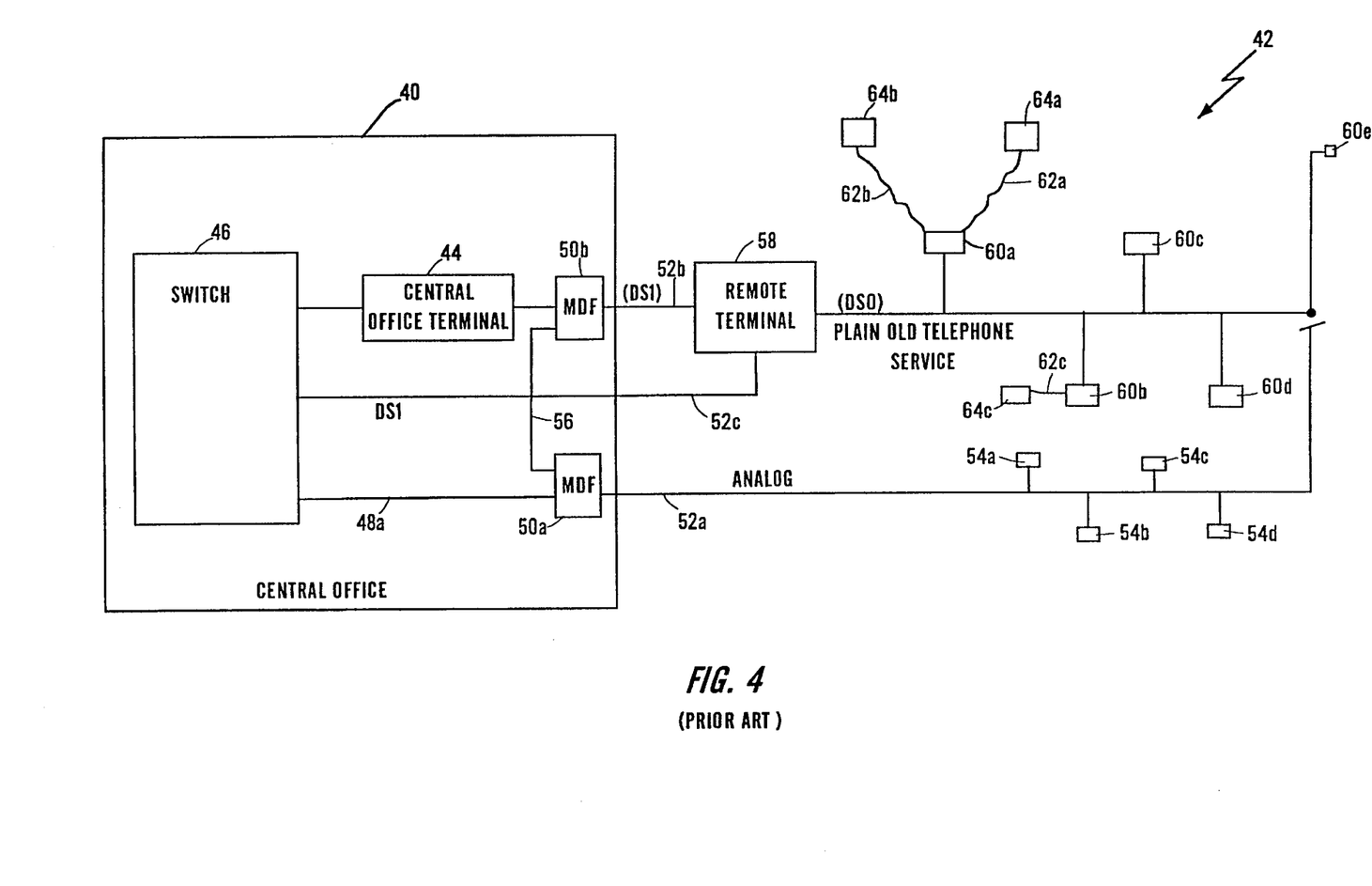
FIG. 4 is a diagram disclosing a conventional (prior art) arrangement by which facilities are changed from old equipment to new equipment.

For example, FIG. 4 shows an exemplary telephone network system showing a central office 40 and a local loop 42. The central office includes a central office terminal (COT) 44, and a switch 46. The switch 46 may actually comprise several switches of the central office 40. As shown, the switch 46 includes an analog line 48a that consists essentially of twisted pair wire. The analog line 48a is coupled to the switch 46 and a main distribution frame (MDF) 50a. The analog telephone service is provided by the central office 40 on line 52a via the MDF 50a coupled to the analog path 48a. The analog line 52a provides twisted pair wires to a plurality of subscribers 54a–54d via drop or loop wires.

The switch 46 is also connected to a digital line that provides digital (DS1) service on path 52b after passing through the COT 44 and an MDF 50b. The COT 44 provides connections between the switch 46 and the remote terminal in order to provide dial tone, as well as dial tone requests. In a cable throw operation to replace the analog line 52a with the digital line 52b, the technician would first install a backtap 56 to each of the main distribution frames 50a and 50b. The backtap 52b duplicates service on the two lines 52a and 52b, such that the field technician obtains an identical dial tone on both the old and the new terminal, so that the central office 40 is wired to both facilities 52a and 52b. The field technician then would rewire all the telephone numbers of the old cable 52a to the new cable 52b, take down the old analog cable 52a, and remove the backtap 56, thereby leaving the new service on the new digital cable 52b, which supplies the DS-1 digital signal to a remote terminal 58 for conversion to a DS-0 line. The signal is supplied to feed terminals 60a–60e that supply subscribers, such as 64a–64c, via drop wires 62a–62c, respectively.

A substantial amount of coordination is required between the central office personnel and the field service technicians when performing the cable throw. In addition, problems are encountered in attempting a cable throw operation in integrated systems. In such systems the switch 46 would include the functions of the COT 44 and the MDF 50 in order to output signals directly from the switch 46 to the remote terminal 58 via a digital line 52c. In such cases, there is no place where a physical connection can be made to build a backtap, since the switch is implemented as an integrated system. Consequently, any cable throw operation requires substantial reconfiguration of the switch 46 by central office personnel.

SUMMARY OF THE INVENTION

It is an object of the present invention to provide an arrangement that enables field service technicians to perform operations such as cable throws, rewires, service activation and verification, etc., with a minimal amount of coordination between central office personnel.

It is a further object of the present invention to provide an arrangement for performing modifications in the local loop, using techniques that are independent of the hardware of the switches in the central office.

In order to achieve these and other objects, the present invention provides for performing modifications to a local loop coupled to a central office. The system according to the present invention includes a network interface that enables a field service technician to directly access computer control systems used in the control and maintenance of the public switched telephone network. The field service technician initiates a service session by identifying the function to be performed, as well as the intended subscriber locations. The control system accesses the appropriate control processor which generates the appropriate recent change signals in response to the inputs by the field service technician. The recent change signals are provided to a processor which distributes the recent change signals to the appropriate central office switch corresponding to the subscriber's location.

According to the present invention, the processor system controlling these switches is preloaded with the change information identifying the subscriber, the old equipment to be replaced, and the new equipment. Consequently, the field service technician is able to implement the rewire, cable throw or other service in the local loop without interaction with central office personnel.

As an example of the teachings of the present invention, an embodiment of the present invention is disclosed as a voice response cable transfer unit, used by service technicians to convert subscriber lines, for example, from analog service to digital service. The new service may include either fiber or copper lines. The system may be used in the case of an individual rewire in which an existing subscriber's line is physically rewired to a new termination, or in the case of a cable throw operation, involving the transfer of an entire cable to a new replacement cable for multiple subscribers. The transfer is made by the technician in a controlled environmental vault (CEV) remote from the central office. Alternatively, the transfer can be done at the feed terminal in front of subscriber's house or even at the NID (Network Interface Device). The voice response cable transfer unit (VRCT) will permit changing dial tone to a large number of subscriber lines. The VRCT enables considerable savings of time and effort when compared with the prior practice required to move the dial tone one pair at a time. The VRCT, which is not involved in the actual work of changing the cable, permits rapid change over of dial tone source at the central office for a large number of line pairs.

BRIEF DESCRIPTION OF THE DRAWINGS

These and other objects and advantages of the invention will become more apparent from the following detailed description of the presently preferred exemplary embodiments of the invention taken in conjunction with the accompanying drawings, of which.

DETAILED DESCRIPTION OF THE PREFERRED EMBODIMENT

Figure 5:
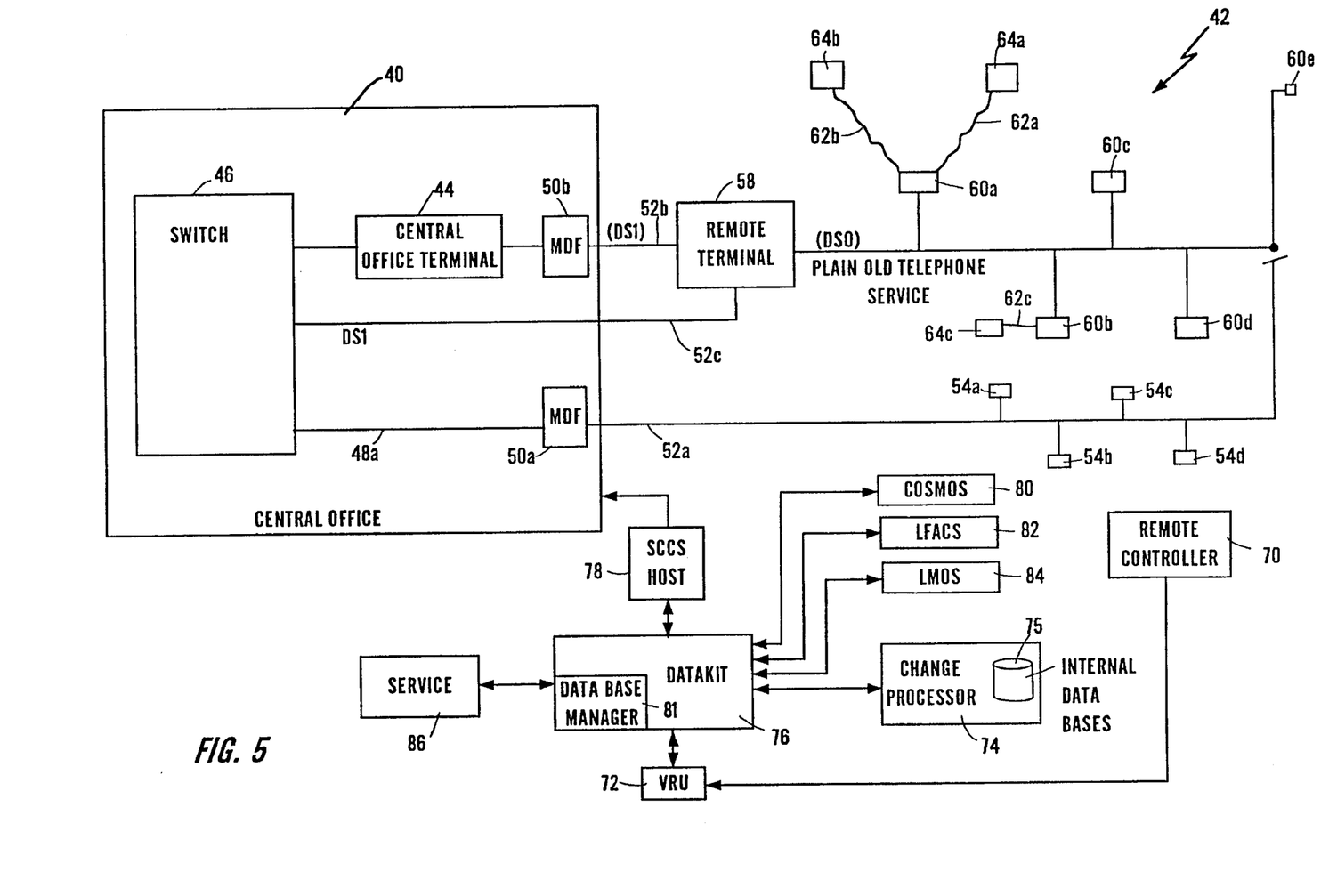
FIG. 5 is a diagram disclosing an arrangement for performing remote installation of facilities in accordance with a preferred embodiment of the present invention.

FIG. 5 discloses an arrangement for remote activation of facilities according to a preferred embodiment of the present invention. According to the present invention, a field technician is not required to perform hardware changes (e.g., cable throw, rewire, etc.) in conjunction with coordinated efforts by a frame attendant responsible for updating the necessary databases at the central office. Rather, prior to the work by the field technician, the database manager of the appropriate system will identify the facilities that are to be modified and/or the office equipment (OE) to be replaced for the application (e.g., cable throw, rewire, undeveloped transfer, etc.) on the basis of telephone number, old equipment, and new equipment, respectively. After completing all hardware installation and testing, the field technician independently accesses the system in order to activate the new facility.

FIG. 5 shows an arrangement by which the field technician is able to access the telephone network in order to activate new facilities using a remote controller 70. The remote controller 70 may be, for example, a dial set, although the dial set may be replaced with a lap-top computer for more advanced applications as discussed below. The field technician will usually perform a continuity test on the new circuit before dialing into the network. After the field technician has successfully completed the continuity test, the field technician will dial into a voice response unit (VRU) 72, using either a spare dial tone or a customer's dial tone. The VRU 72 is preferably implemented as a digital voice synthesizer capable of handling up to twenty-four (24) calls simultaneously, although different voice response units may be used to accept inputs from the field technician via the remote controller 70. The voice response unit 72 is adapted to communicate with a change processor 74 via a Local Area Network (LAN) Datakit 76. The Datakit 76 is known in the art as a communication system manufactured by AT&T, used to access the computer control and database systems and the public switch telephone network under the control of a data base manager 81. The change processor (CP) 74 is preferably an AT&T product known as the "4000", which includes a 3B-15 computer made by AT&T. The change processor 74 receives downloaded information from databases and control systems that supply OE information in response to a prior request from a database manager. The CP 74 stores the downloaded information in its own internal databases 75. The downloaded information stored in the change processor databases 75 identifies facilities that are to be modified and/or the OE to be replaced on the basis of telephone number, old equipment, and new equipment.

The VRU 72 communicates with the field technician by executing a digital speech driver program (DSDRV) that generates voice commands. Alternatively, the DSDRV is executed in the CP 74, which outputs the appropriate voice commands to the VRU 72 via the Datakit 76. Upon entering the appropriate access identification, the field technician is able to communicate with the change processor (CP) 74, which prompts the field technician as to the type of service being performed (e.g., cable throw, rewire, undeveloped transfer, etc.). After the field technician identifies the service using the remote controller 70, the change processor 74 prompts the field technician via the VRU 72 to identify the facilities being serviced, preferably in the form of a ten-digit telephone number, which may be used in some instances to identify a group of subscribers. The change processor 74 processes the ten-digit number supplied by the field technician, and compares the supplied ten-digit number with its internal databases to determine if the supplied ten-digit number corresponds to previously downloaded data with respect to facilities to be modified. If the change processor 74 does not match the supplied ten-digit number with a downloaded number, the change processor 74 supplies an appropriate message to the remote controller 70 via the VRU 72, for example, "telephone number not on file", and terminates (disconnects) the call. If, however, the change processor 74 matches the supplied ten-digit number with a telephone number stored in the internal databases, the change processor 74 generates the appropriate recent change signals for the office equipment/switch corresponding to the ten-digit number, depending on the switch type (e.g., DMS-100, 5ESS, etc.), and outputs the recent change signals to a switching control center system (SCCS)Host 78. The SCCS Host 78 supplies the recent change signals to the central office 40 for activating the new equipment. The SCCS Host 78 also provides the recent changes signals to other appropriate databases in order to register the change in OE.

According to the preferred embodiment, the SCCS Host 78 provides remote access to the switch in order to perform modifications to the central office switch 46. As known in the art, the SCCS Host 78 comprises computers such as a 3B-15, 3B-20, etc., which obtain information from a switch maintenance section of the central office mainframe. The CO mainframe (not shown) receives information about the switch 46 via leads from the switch components. Thus, the SCCS Host 78 monitors the central office 40 based on the information supplied from the central office mainframe, and allows interactivity with the central office 40 either automatically or through the requirements of a technician. In addition, the SCCS Host 78 is able to look for alarms, look for troubles, and to print out the results at a switching control center for intervention by technicians, or to a display which may in turn activate an alarm at the center.

As discussed above, the CP 74 receives downloaded information from the appropriate database in order to generate recent change signals for a switch corresponding to a given telephone number supplied by the field technician. Depending on the application, the CP 74 receives the downloaded information from different databases via the Datakit 76. For example, the CP 74 may receive downloaded information from a Facility Assignment Control System (FACS) that automatically assigns loop facilities and office equipment to a subscriber address to provide the telephone service. FACS attempts to optimize the use of loop facilities and office equipment including jumper cables and minimize the amount of unused inventory and cost to the telephone service provisioning company.

As shown in FIG. 5, the CP 74 is able to communicate via the Datakit with a computer system for main frame operation (COSMOS) 80; a loop facility assignment and control system (LFACS) 82; a loop maintenance operation system (LMOS) 84; and/or a system to expect and route verification and input of customer enhancements (SERVICE) 86. Other systems may be accessed by the Datakit as needed.

The LFACS 82 and the COSMOS 80 systems are part of the FACS system. LFACS 82 is a Bellcore designed system that inventories and assigns all loop facilities from a customer's premises to the main distributing frame in the central office.

COSMOS 80 manages the central office facility inventory including OE and telephone numbers (TNs). COSMOS 80 is primarily directed to the overall administration of office equipment as connected to local loop. LMOS 84 is an AT&T developed system used to maintain line records and identifying network troubles. Finally, SERVICE 86 stores enhanced services such as call waiting, call forwarding, three-way calling, caller ID™, and other IQ™ services.

As known in the art, COSMOS 80 stores all the assigned equipment; to make changes, the hardware facilities changes need to be made at the same time as changes in the COSMOS database to ensure that there are no inconsistencies between the COSMOS database and the equipment in use.

According to the preferred embodiment, however, the database manager of COSMOS 80 can identify the facilities that are to be modified and/or the OE to be replaced on the basis of telephone number, old equipment and new equipment, respectively. The request may come from LFACS 82, or SERVICE 86. The downloading of the information to the change processor 74 therefore eliminates any need to simultaneously update the COSMOS 80 system at the same time that new facilities are activated. Rather, a field technician can access the control processor 74 via the Datakit and the VRU 72 to cause the CP 74 to generate the recent change signals whenever appropriate for the field technician. The SCCS Host 78 then dispatches the recent change signals to the switch 46 and any necessary databases, such as COSMOS 80, LFACS 82, LMOS 84, etc.

Figure 6:
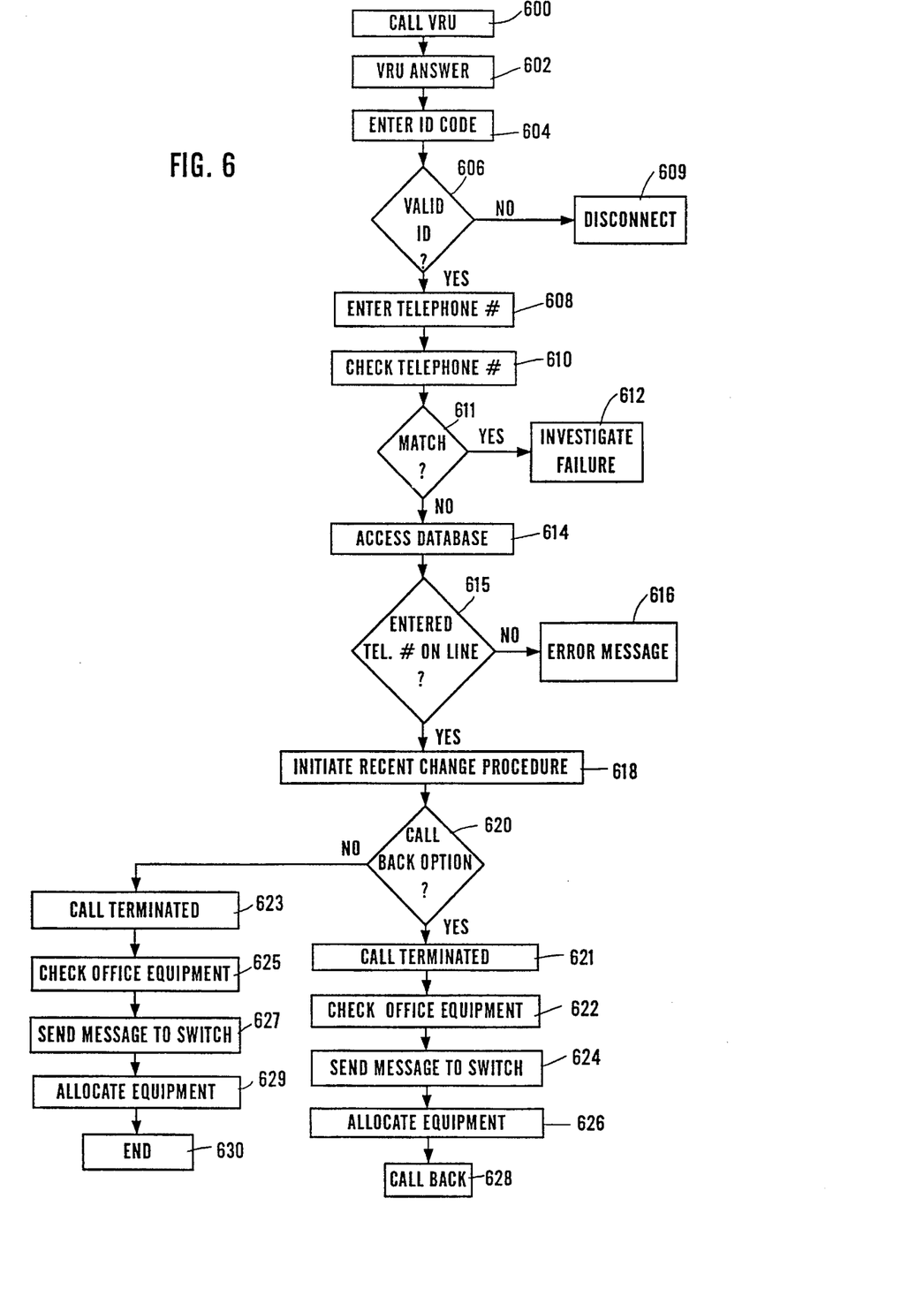
FIG. 6 is a flowchart of a method for performing the remote installation using the arrangement disclosed in FIG. 5 in accordance with the present invention.

FIG. 6 is a flowchart showing the method of the present invention. According to the preferred embodiment of the present invention, a field service technician accesses the control system and transmits instructions via a voice response unit in order to reach access to a Datakit that serves as a communication path for software control data. The Datakit is under the control of a computer which includes, for example, a program for copper to fiber (CTF) exchange. Recent Change messages, containing new digital office equipment identification, are created and transmitted over a Recent Change Channel to the appropriate End Office. If the change cannot be done without problem, the control system will automatically default back to analog office equipment.

As shown in FIG. 6, the technician located at the distribution terminal, the CEV or the network interface device, can initiate the change over by placing a telephone call over the network to the voice response unit (VRU) (step 600). The customer's dial tone source can be used so that there is no need to bridge to a separate source. The VRU will answer the call (step 602) and prompt for the security code of the technician (step 604). After verification of the DTMF ID input (step 606), the VRU prompts the technician to enter the 10 digit telephone number that is to be converted (step 608). If the ID input is not valid, the caller is disconnected (step 609). Protocol will be provided for verification of the telephone number.

The control system in communications with the technician has the capability of checking the phone number to be converted (step 610) against a record of numbers previously entered (step 611). A match would be recognized as a failure of a previous attempt to convert, this triggering investigation at the switch (step 612). If no match occurs, a system database is accessed (step 614) to determine whether the telephone number has been entered as being on line (step 615). If the telephone number is not on line, an error message is sent back to the technician and the loop is terminated (step 616). If the telephone number is listed in the database, the program initiates the recent change procedure while the technician is on line (step 618). The technician is given the option of being called back after the change is completed (step 620).

After the technician terminates the call (steps 621, 623), the program will then look up the old OE and corresponding new OE for the telephone number in the database (step 622 or 625). A recent change message is then generated and transmitted through the Datakit network to the switch (step 624 or 627). The switch is thus instructed to allocate digital equipment for the telephone number (step 626 or 629). If the technician had elected a call back, the switch will place a call to the telephone number over a digital loop (step 628). Ringing of the call indicates successful transfer. If the technician had not elected a call back, the program ends (step 630). In this manner the system moves all of the translations from the copper to the digital loop and tests the transfers.

The following examples illustrate potential applications of the remote controller 70 by the field technician.

The present invention is particularly useful for system upgrades, for example replacing twisted pair with optical fiber for upgrading networks to provide video broadband services using to-the-curb optical fiber service or hybrid-fiber coax. After installing the optical fiber, a field technician may access the CP 74 in order to activate the cable throw. The change processor 74 sends the recent change signal preferably on the maintenance channel, or possibly on the recent change channel, to the appropriate SCCS Host 78 as identified in the internal database of the CP 74.

The field technician may also use the remote controller 70 when installing multiple circuits (for example, 100, 200, 500) in a new community. In such a scenario, an equipment change is marked in COSMOS as "undeveloped transfer". The database manager goes into COSMOS and extracts the information for the corresponding switch 46 for downloading into the CP 74.

In another application, a field technician can activate service coincidentally with moving a drop wire in the case of a rewire.

The present invention may also be applied to eliminate the need for RCMAC. For example, a field technician can perform tests on the facility and then call the VRU 72 in order to activate the subscriber without waiting for the RCMAC. In addition, the necessity for manual access to the COSMOS slice switch is also removed, since the database manager can download any number of circuits at one time to the CP 74, thereby eliminating the need for a frame attendant.

The invention may also be applied to a maintenance transfer, whereby there exists trouble on the old line and the tech wishes to provide service on a new facility.

In a variation of the above embodiment, the present invention may be modified to enable subscribers to directly access the VRU 72 in order to modify services. For example, if a customer decides to purchase three-way calling service, or to try three-way calling service during a trial period, the change processor 74 can receive downloaded information from SERVICE 86 and generate recent change signals in response to customer inputs identifying a desired service.

In addition, the present embodiment may be modified such that the remote controller 70 includes a lap-top computer to enable the technician to access the Datakit 76 directly. In such a case, the field technician could act as the database manager and directly access the appropriate databases, such as COSMOS 80, LFACS 82, LMOS 84 and/or SERVICE 86, to download the appropriate information to the CP 74.

Thus, the present invention provides an improved technique for enabling access to generate recent change signals for new OE, with minimal involvement by central office personnel. The present invention may be used by a field technician to either verify or activate customer enhancements, or to make changes such as cable throw, rewire, or undeveloped transfer in the local loop.

Finally, the present invention may be modified to enable customer access so that customers can call up and activate or deactivate the services over the phone. In such instances, a customer would likely use a soft dial tone in order to activate service to obtain a hard dial tone. A soft dial tone is a dial tone which permits access to only a limited sub-set of network services available to normal subscribers, to network lines which are "disconnected". When subscribers are "disconnected" they are only logically disconnected, that is, they are placed in an inactive status without physically disconnecting them from the network. The subscribers in a disconnected (inactive) status are provided with soft dial tone whereby they may access only a limited number of network services such as 911 emergency dialing and the placing of calls to the telephone company business office. Provision of these limited services is possible because of office equipment number rather than the telephone number (which is not valid for a disconnected user) of the telephone line at the user's location is used to identify the line requesting service.

The use of soft dial tone may be implemented by incorporating the arrangement of FIG. 5 into a public switched telephone system having advanced intelligent Network (AIN) capabilities. In an AIN type system certain calls receive specialized AIN type processing under control of data files stored in an SCP database within an ISCP. In such a network, the SSP type local offices of the public telephone network detect a call processing event identified as an AIN "trigger". For ordinary telephone service calls, there would be no event to trigger AIN processing; in such cases the local and toll office switches would function normally to process the calls as discussed above, without referring to the SCP database for instructions. An SSP type switching office which detects a trigger, however, will suspend call processing, compile a TCAP formatted call data message and forward that message via common channel interoffice signalling (CCIS) link and STP(s) to the ISCP which includes the SCP database. This TCAP query message contains a substantial amount of information, including, for example, data identifying the off-hook line, the number dialed and the current time. Depending on the particular AIN service, the ISCP uses a piece of data from the query message to identify a subscriber and access the subscriber's files. From the accessed data, the ISCP determines what action to take next. If needed, the ISCP can instruct the central office to obtain and forward additional information, e.g., by playing an announcement to receive and collecting dialed digits or to receive voice input. Once sufficient information about the call has reached the ISCP, the ISCP accesses its stored data tables to translate the received message data into a call control message. The call control message may include a substantial variety of information including, for example, a destination number and trunk group selection information. The ISCP returns the call control message to the SSP which initiated the query via CCIS link and the STP(s). The SSP then uses the call control message to complete the particular call through the network. Thus, the use of a soft dial may be adapted to generate an AIN trigger whereby the ISCP, in response to a subscription request from the residential user, interacts with the CP 74 so that the appropriate recent change signals are generated to activate the subscriber service to a hard dial tone. A more detailed description of soft dial tones is disclosed in U.S. patent. application Ser. No. 08/264,166, filed Jun. 22, 1994, the disclosure of which is incorporated in its entirety by reference.

As would be appreciated in the art, the remote controller 70 may access the Datakit by using either a dial tone, or by a cellular phone call.

In a variation of the above embodiment, the use of a lap-top as the remote controller 70 would enable a technician to use the remote controller 70 as an intelligent peripheral (IP) in an AIN network in order to communicate with an ISCP. In such a case, the remote controller 70 having IP capabilities could bypass the maintenance channel inputs and directly supply inputs such as translation tables into the switch 46 using the common channel signaling network. A more detailed description of AIN networks and intelligent peripherals may be found in U.S. Pat. No. 5,247,571, issued on Sep. 21, 1993 to Kay et al., and U.S. Pat. No. 5,467,388, issued on Nov. 14, 1995, to Redd, Jr. et al. the disclosures of which are incorporated in their entirety by reference.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

We claim:

1. In a public switched telephone network having a plurality of central offices each serving a corresponding plurality of subscribers, said network comprising facilities for coupling said subscribers to corresponding central offices, said central offices each comprising a switch storing office equipment information for each of said corresponding subscribers, a method for remotely activating said facilities for selected subscribers comprising the steps of:

accessing a change processor in said public switched telephone network, said change processor comprising a database storing a plurality of subscriber numbers corresponding to said selected subscribers and a corresponding plurality of new equipment data previously downloaded from an equipment database;

supplying at least one subscriber number for comparison with a record of subscriber numbers previously downloaded to said change processor, in response to a subscriber query generated by said change processor; and inputting an activation request to said change processor in response to a service query generated by said change processor, said change processor outputting recent change signals to one of said central office switches corresponding to said at least one subscriber number, said recent change signals corresponding to assigned office equipment and facilities for at least one of said selected subscribers.

2. A method as recited in claim 1, wherein said accessing step comprises the steps of:

calling a voice response unit using a remote dial terminal, said voice response unit adapted to receive commands from said change processor via a communications network;

entering access information to said voice response unit in response to an access query from said voice response unit, said communications network establishing a service session between said remote dial terminal and said change processor via said voice response unit in accordance with said access information.

3. A method as recited in claim 2, wherein said inputting step comprises the step of selecting an activation service from one of a cable throw, a transfer, an undeveloped transfer, and one of a plurality of enhanced customer services.

4. A method as recited in claim 3, wherein said enhanced customer services include call waiting, three-way calling, caller ID, and call blocking.

5. A method as recited in claim 3, wherein said cable throw service causes said one corresponding central office switch to activate a first cable and disengage a second cable associated with said at least one subscriber number.

6. A method as recited in claim 5, wherein said first cable comprises copper cable and said second cable comprises optical fiber cable.

7. A method as recited in claim 1, wherein host processor system further supplies said recent change signals to facilities databases.

8. A method as recited in claim 1, further comprising the step of requesting a call back from said change processor, said change processor executing said call back request upon activation of said facilities in response to said recent change signals.

9. A method as recited in claim 1, wherein said accessing step comprises the step of calling a virtual number in an advanced intelligent network (AIN) using a soft dial tone, said supplied subscriber number being input to said change processor by an integrated services control point (ISCP) in response to a query message from said one corresponding office switch.

10. A method as recited in claim 1, wherein said accessing step comprises the step of calling a communication interface of a communications network in said public switched telephone network using a remote computer adapted to communicate with said communications network.

11. A method as recited in claim 10, wherein said supplying step comprises the step of uploading translation tables from said remote computer to said change processor identifying said selected subscribers and said assigned facilities.

12. In a public switched telephone network comprising a plurality of end offices each having a switch coupled to corresponding subscribers by facilities, each of said subscribers having assigned office equipment and facilities identified by data stored in a network database, a system comprising:

a facilities processor adapted to store a plurality of unused facilities data corresponding to unused facilities;

a change processor comprising a change database adapted to store at least a portion of said data identifying assigned office equipment and facilities corresponding to selected subscribers downloaded from said network database and at least one of said unused facilities data downloaded from said facilities processor, said change processor generating recent change signals for said end office switches corresponding to said selected subscribers in response to a remote activation signal; and communication means for supplying said downloaded data from said network database and said facilities processor to said change processor in response to a database manager download command and for supplying said recent change signals from said change processor to said corresponding end office switches and said network database.

13. A system as recited in claim 12, wherein said communication means comprises a voice response unit responsive to dual tone multi-frequency (DTMF) tones from a remote dial set and generating said remote activation signal in response to said DTMF tones.

14. A system as recited in claim 13, wherein said voice response unit comprises a digital speech driver that generates voice responses.

15. A system as recited in claim 13, wherein said change processor comprises a digital speech driver generating digital speech commands, said communication means supplying said digital speech commands to said voice response unit, and said voice response unit generating voice responses in response to said digital speech commands.

16. A system as recited in claim 12, wherein said communication means is responsive to a remote computer supplying said remote activation signal, said remote computer supplying translation tables to said change processor identifying said selected subscribers and said corresponding unused facilities data via said communication means.

17. A system as recited in claim 16, wherein said remote computer is an intelligent peripheral, said public switched telephone network comprises an advanced intelligent network (AIN) responsive to said intelligent peripheral, and said communications means comprises a common channel signaling network for supplying said recent change signals to said corresponding end office switches.

18. A system as recited in claim 12, wherein said facilities for each of said end offices comprises optical fiber having a first end coupled to said switch of said respective end office, a remote terminal coupled to a second end of said optical fiber, and a plurality of feed terminals receiving service from said remote terminal.

19. A system as recited in claim 12, wherein said communication means comprises a host processor for remotely communicating with said switches of said respective end offices, said host processor adapted to selectively receive and transmit signals to each of said switches.

20. A system as recited in claim 19, wherein said communications means further comprises a Datakit processor for enabling communication between said facilities processor, said change processor, and said host processor in communication with said switches.

21. A method for changing services for a subscriber coupled to a central office of a public switched telephone network, comprising the steps of:

downloading existing equipment data from an equipment database to a change processor having an internal database, said existing equipment data comprising data identifying existing office equipment and facilities assigned to said subscriber;

supplying new equipment data to said internal database of said change processor identifying new equipment used to provide one or more services for said subscriber;

from a remote location causing said change processor to generate signals for said central office corresponding to said new services for said subscriber; and dispatching said signals to a switch within said central office to activate said new services for said subscriber.

22. A method as recited in claim 21, wherein said supplying new equipment data step comprises the step of causing a database manager to access one of a plurality of network processors to download said existing equipment data to said internal database of said change processor.

23. A method as recited in claim 22, wherein said one of a plurality of network processors is selected from one of a computer system for mainframe operations system (COSMOS), a loop maintenance operation system (LMOS), a loop facility assignment and control system (LFACS), and a system to expect and route verification and input of customer enhancements (SERVICE).

24. A method as recited in claim 21, wherein said supplying step comprises the steps of:

accessing said public switched telephone network from a remote location using a computer; and uploading said new equipment data to said internal database from said computer.

25. A method as recited in claim 24, wherein said computer is an intelligent peripheral and said public switched telephone network comprises an advanced intelligent network responsive to said intelligent peripheral.

26. A method as recited in claim 21, wherein said causing step comprises the steps of:

providing a soft dial tone to said subscriber; and generating recent change signals in response to a service request from said subscriber via said soft dial tone.

27. A method as recited in claim 26, wherein said causing step further comprises the steps of:

dialing a voice response unit adapted to communicate with said change processor;

supplying a DTMF password in response to a voice prompt from said voice response unit;

supplying at least one telephone number identifying at least said subscriber to receive said new services; and selecting one of a plurality of service change requests in response to a second voice prompt from said voice response unit.

28. A method as recited in claim 26, wherein said service request is for a rewire, a cable throw, and an undeveloped transfer.

* * * * *